United States Patent
Morgan et al.

(10) Patent No.: US 6,931,859 B2
(45) Date of Patent: Aug. 23, 2005

(54) VARIABLE TURBINE COOLING FLOW SYSTEM

(75) Inventors: Peter L. Morgan, Tempe, AZ (US); William J. Howe, Chandler, AZ (US); Mark C. Morris, Phoenix, AZ (US); Adrian R. Allan, Chandler, AZ (US); Donald L. Palmer, Cave Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/739,754

(22) Filed: Dec. 17, 2003

(65) Prior Publication Data
US 2005/0132711 A1 Jun. 23, 2005

(51) Int. Cl.[7] ............................... F02C 7/12
(52) U.S. Cl. ................ 60/782; 60/785; 137/494
(58) Field of Search .................. 60/782, 785, 806; 415/26, 115; 416/42, 96 R, 97 R; 137/494

(56) References Cited

U.S. PATENT DOCUMENTS

| 3,366,315 | A | 1/1968 | Alberani |
|---|---|---|---|
| 3,535,873 | A | 10/1970 | Szdlowski |
| 3,814,313 | A | 6/1974 | Beam et al. |
| 3,972,181 | A | 8/1976 | Swayne |
| 4,217,755 | A | 8/1980 | Williams |
| 4,596,116 | A * | 6/1986 | Mandet et al. ................ 60/785 |
| 5,090,193 | A | 2/1992 | Schwarz et al. |
| 5,261,228 | A | 11/1993 | Shuba |
| 5,351,473 | A | 10/1994 | Shuba |
| 5,996,331 | A | 12/1999 | Palmer |
| 6,152,685 | A | 11/2000 | Hagi |

* cited by examiner

Primary Examiner—Ehud Gartenberg
(74) Attorney, Agent, or Firm—Robert Desmond, Esq.

(57) ABSTRACT

Cooling air to the blades and disks of a gas turbine may be modulated to provide a variable turbine cooling flow. A bellows may be extended by providing a high pressure compressor discharge flow to an interior of the bellows. The bellows may be compressed when the interior of the bellows communicates with ambient pressure air. The extension/compression of the bellows moves an arm over orifices in a cooling air flow path. The pressure inside of the bellows is metered to move the arm over at least one orifice, thereby restricting cooling air flow when the engine is running at low power. The pressure inside of the bellows is metered to move the arm to uncover all of the slots to provide maximum cooling flow when the engine is running at high power. The resulting variable cooling flow system results in less need for cooling air at low powers, thus reducing engine fuel consumption.

27 Claims, 3 Drawing Sheets

VARIABLE TURBINE COOLING FLOW SYSTEM

BACKGROUND OF THE INVENTION

The present invention generally relates to a system for providing cooling flow to the turbine components of a gas turbine and, more particularly, to a system for providing a variable turbine cooling flow to the turbine at various power and altitude conditions.

A conventional turbine rotor cooling system may be designed to satisfy cooling needs of the high pressure turbine (HPT) blade and of the turbine disk at maximum turbine inlet temperature and compressor discharge conditions. This condition usually occurs at maximum engine power. At lower power settings, the turbine coolant air and gaspath temperatures are much lower. Coolant air temperature is lower at altitude than at sea level, even when gaspath temperature is high. In these cases, since the cooling circuit geometry is fixed the coolant flow rate requirements are less than the actual flow rate. The source of the cooling air is compressor discharge air. Use of an excess of this air, because it has had compression work done on it by the engine, adversely impacts the engine performance. For many applications, the desire to minimize fuel burn is most critical at lower power levels, because more operating time is spent at lower power levels as compared to time spent at high power.

Referring to FIG. 1, there is shown a conventional HPT cooling system. Turbine coolant air, 100, is delivered from the compressor section of the engine. Compressor discharge air flows as indicated by arrow 102 passes through passages 104. After passing through passages 104, the cooling air is divided into three separate cooling flows, as indicated by arrows 105, 106, 108. Cooling flow 105 provides cooling air for a downstream turbine disk (not shown). Cooling flow 106 provides cooling air for the high pressure turbine disk 110 and turbine blade, 112. Cooling flow 108 provides cooling air for the sealplate forward of the turbine disk.

U.S. Pat. No. 5,996,331 discloses a passive system in which a modulating device is arranged in the engine such that pressures generated within the engine may naturally activate a bellows which axially positions a sleeve over a flow control restriction. This passive system relies on pressures generated in the engine to naturally activate the bellows. There is no active control relationship between the temperature and/or power level angle and the amount of cooling flow through the turbine.

U.S. Pat. No. 4,217,755 discloses a control valve for effecting flow modulation using plenum discharge/ambient pressures for flow control. Axial annular member 140 acts as an axial spring to push leaf spring 144 axially closed or pull leaf spring axially open (FIG. 1). Annular member 140 and leaf spring 144 are assembled in a configuration that is prone to vibration oscillation and potential "Hemholtz" cavity resonation which may cause vibrational fatigue in gas turbine engines. The radial cooling over the leaf spring end 152 may also result in "reeding" and increased noise in the engine. In addition, this system has very little vibrational damping. This could result in component fatigue and cooling flow oscillation as the leaf spring system resonates. This patent requires that flow migrate past the flow control leaf spring outer edge 152 to provide full turbine cooling flow. Additionally, this patent uses a large radial leaf spring 144 to effect flow modulation. Many applications do not have the radial space to incorporate this size of an assembly. Further, this patent requires evacuation of the undercut cavity 130 to produce the required pressure differential across the leaf spring to open the flow circuit and adequately cool the turbine at high temperature conditions. Thus, if the exhaust circuit 164 gets plugged with dirt, compressor abraidable, etc. then the system may fail to deliver acceptable turbine cooling.

As can be seen, there is a need for an improved turbine cooling flow system that varies the amount of coolant flow being delivered to the turbine blades and disk at low power conditions.

SUMMARY OF THE INVENTION

In one aspect of the present invention, a variable flow cooling system comprises a source of cooling fluid providing a cooling fluid flow along a flow path; a flow restriction element in the flow path having at least two sets of orifices therein; a source of pressurized fluid; a bellows consisting of two parallel wave seals or springs having a flow line connecting an interior of the bellows with either the source of pressurized fluid or with ambient air; an arm moveably attached to the bellows wherein movement of the bellows moves the arm to either an open position, covering none of the orifices, or a closed position, covering at least one set of the orifices, thereby restricting flow of the cooling fluid through the flow path.

In another aspect of the present invention, a variable flow cooling system for providing a cooling air flow to components of a gas turbine engine comprises a source of cooling air providing the cooling air flow along a flow path; a flow restriction element in the flow path having at least two sets of orifices therein; a source of pressurized air; a bellows having a flow line connecting an interior of the bellows with either the source of pressurized air or with ambient air; an arm moveably attached to the bellows; a bellows housing; the interior of the bellows is defined by the two springs of the bellows, the housing, and the arm; the arm connected to the bellows free end, thereby moving the arm with the bellows free end, wherein movement of the bellows free end moves the arm to either an open position, covering none of the orifices, or a closed position, covering at least one of the two sets of orifices thereby restricting flow of the cooling fluid through the flow path.

In yet another aspect of the present invention, a variable flow cooling system for providing a cooling air to components of a gas turbine engine comprises a source of cooling air providing the cooling air along a flow path; a flow restriction element in the flow path having two sets of orifices therein; a source of pressurized air provided by a turbine engine compressor discharge; a bellows having a flow line connecting an interior of the bellows with either the source of pressurized air or with ambient air; an arm moveably attached to the bellows; a bellows housing, a bellows free end and the arm; the arm connected to the bellows free end, thereby moving the arm with the bellows free end, wherein movement of the bellows free end moves the arm to either an open position, covering none of the orifices, or a closed position, covering one of the two sets of orifices, thereby restricting flow of the cooling fluid through the flow path; a stop, the arm contacting the stop when the arm is in a closed position, covering one of the sets of orifices, the stop preventing the arm from covering both sets of orifices; and a low friction coating on either the arm or that portion of the bellows housing on which the arm moves when the bellows is extended or compressed wherein the pressure difference on the bellows and arm provides a force to pull the bellows free end over the slots when the interior is at ambient pressure; and wherein the bellows is resiliently restored to its unloaded state when the flow line communicates with the pressurized fluid, thereby moving the arm to uncover the slots.

In a further aspect of the present invention, a gas turbine engine having variable flow cooling system comprises a source of cooling fluid providing a cooling fluid flow along a flow path; a flow restriction element in the flow path having at least two sets of orifices therein; a source of pressurized fluid; a bellows having a flow line connecting an interior of the bellows with either the source of pressurized fluid or with ambient air; and an arm moveably attached to the bellows wherein movement of the bellows moves the arm to either an open position, covering none of the orifices, or a closed position, covering at least one of the two sets of orifices, thereby restricting flow of the cooling fluid through the flow path.

In still a further aspect of the present invention, a method for modulating cooling flow to a turbine, comprises providing the cooling flow along a flow path; disposing a flow restriction element in the flow path having at least two sets of orifices therein; connecting an interior of a bellows with either a source of pressurized air or with ambient air; defining the interior of the bellows by a bellows housing, a bellows free end attached to the arm; movably connecting the arm to the bellows free end, thereby allowing movement of the arm with movement of the bellows free end, wherein movement of the bellows free end moves the arm to either an open position, covering none of the orifices, or a closed position, covering at least one of the two sets of orifices, thereby restricting flow of the cooling fluid through the flow path.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides a turbine rotor (disk, blades and sealplate) cooling system that provides a variable flow of cooling air dependent upon engine conditions such as turbine gas temperature or power level angle. The cooling system of the present invention reduces the amount of coolant flow being delivered to the turbine blades and disk at low power conditions. As discussed in greater detail below, the present invention provides a cooling system that is simple to manufacture, overcomes the effects of varying altitudes, and gives a failure mode cooling sufficient to prevent engine damage. Moreover, another benefit of the cooling system of the present invention is that lower coolant flow at lower power results in a higher blade temperature. Due to thermal expansion of the blade, this higher blade temperature results in a reduced turbine blade tip clearance, yielding improved aerodynamic efficiency. This is unlike conventional coolant flow systems which, among other things, are designed to provide coolant flow sufficient for high power/high temperature operation.

The variable flow turbine cooling system of the present invention may be useful in a variety of different turbine engines. In particular, the variable flow cooling system may be most beneficial in rotorcraft and tanks which operate much of their engine running times at a lower power point. In these types of turbine engine containing apparatus where much of the engine running time is spent at a lower power point, fuel consumption is significantly reduced with the reduction in the required coolant air flow.

Figure 1:
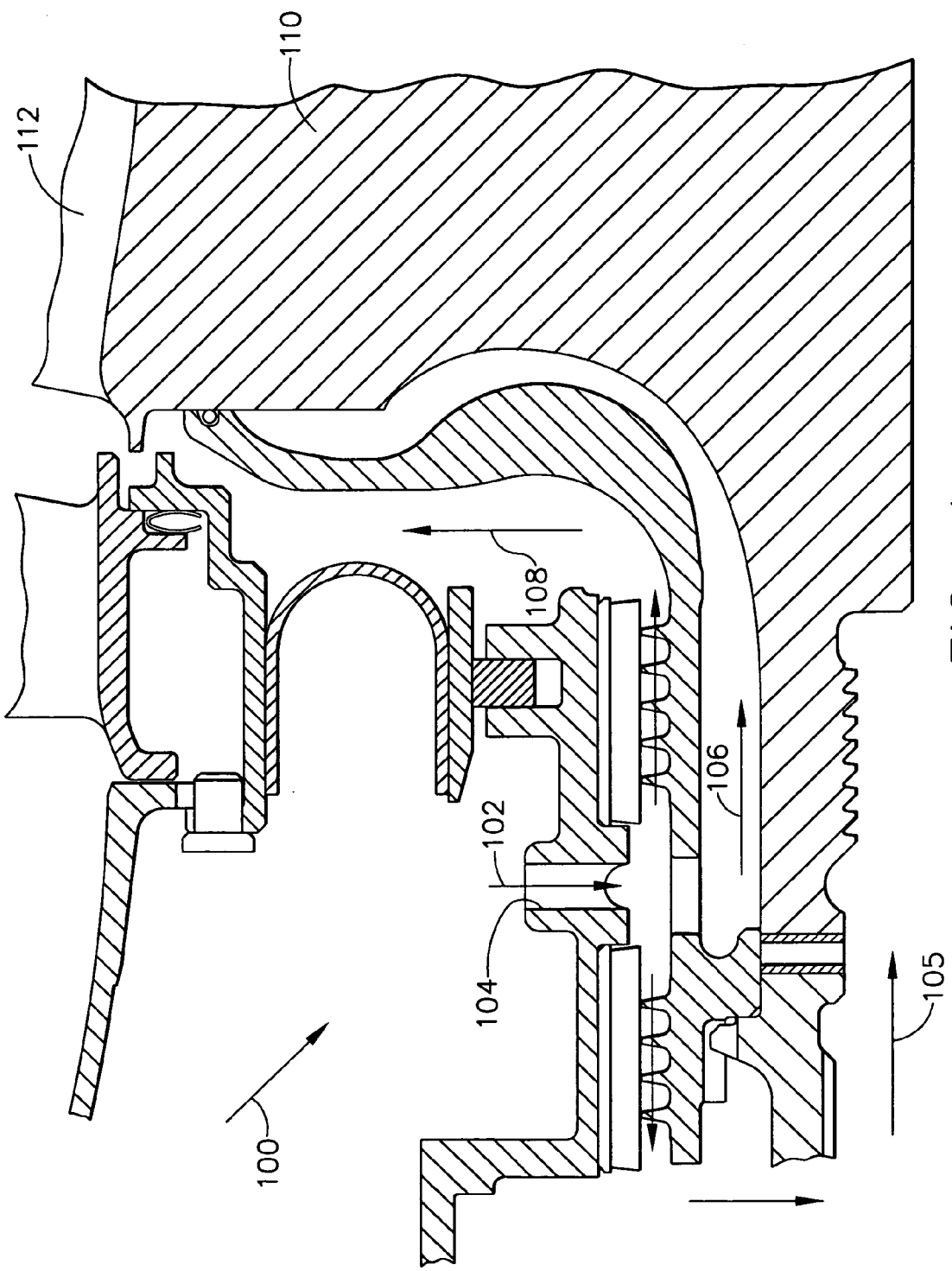
FIG. 1 is a cross-sectional view showing a conventional turbine cooling system.
Figure 2:
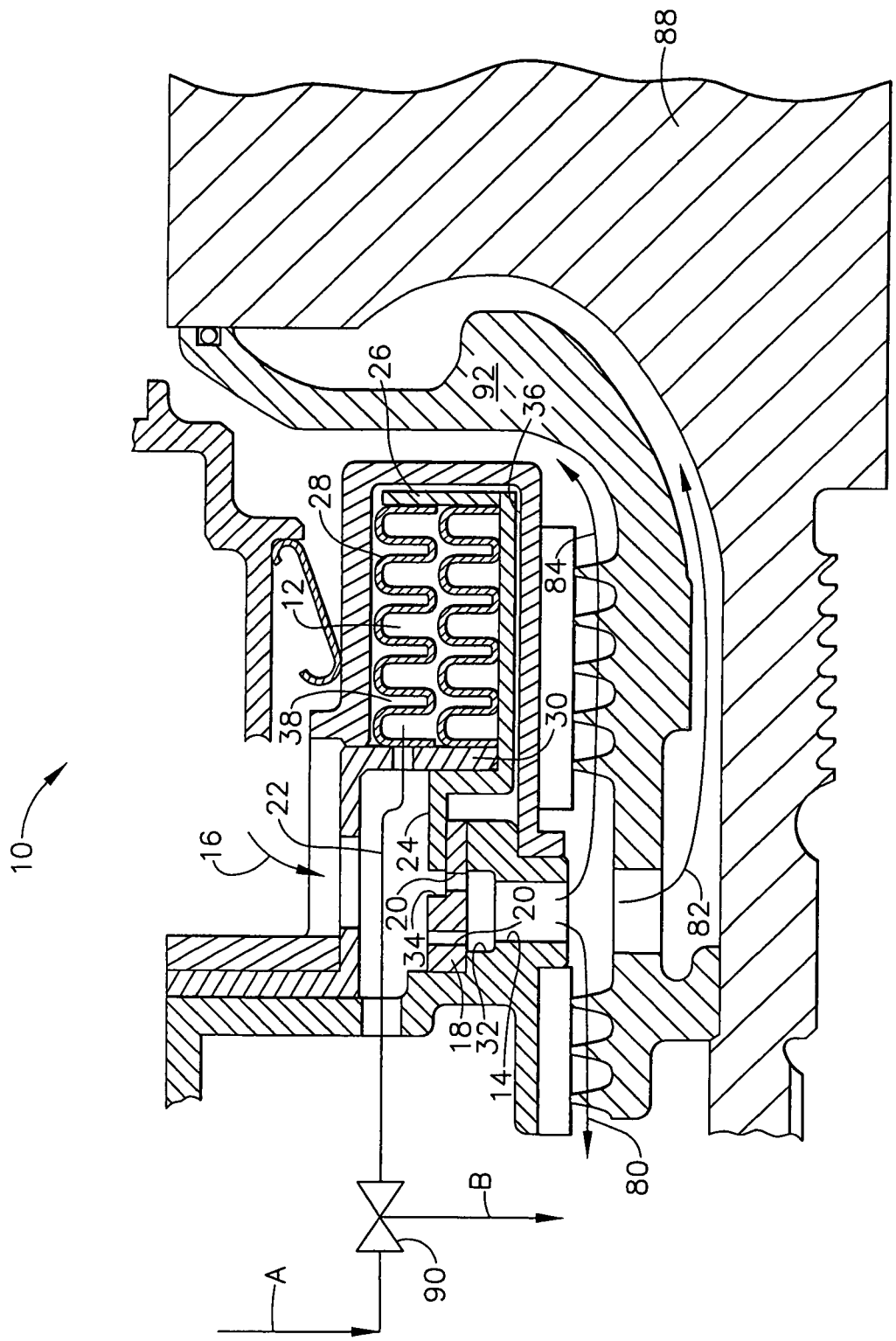
FIG. 2 is a cross-sectional view showing a variable flow cooling system in an open position, according to the present invention.
Figure 3:
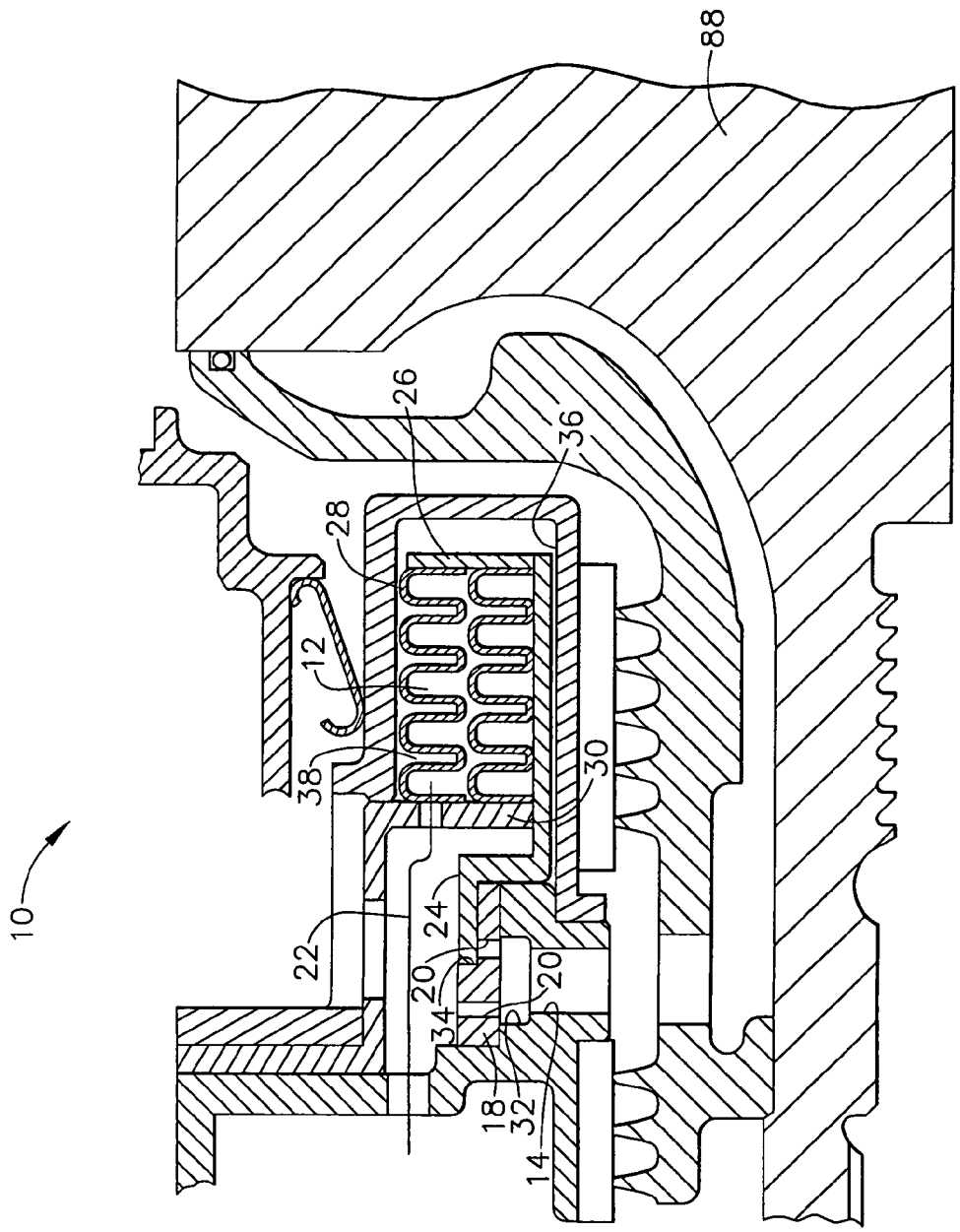
FIG. 3 is a cross-section view of the variable flow cooling system of FIG. 2, in a closed position.

Referring to FIGS. 2 and 3, there are shown cross-sectional views of a variable flow cooling system 10, according to the present invention, in an open position (FIG. 2) and in a closed position (FIG. 3). Under maximum power conditions, a bellows 28 may be fully extended as shown in FIG. 2.

Referring to FIG. 2, air may enter air passages 14 via a path indicated by arrow 16. Downstream of air passages 14, the cooling air flow may be unrestricted and flow via cooling paths 80, 82 and 84 to cool a downstream turbine (not shown), a turbine blade (not shown), a turbine disk 88 and sealplate 92.

Just upstream of air passages 14, a flow restricting element 18 may have sets of axially separated orifices 20 therethrough. Each set of orifices 20 may be located around the flow restricting element 18 at the same axial location. Orifices 20 may be of any shape i.e. slots, holes, or the like. The air pressure on the interior 12 of bellows 28 may be just below the compressor discharge pressure. A flow line 22 may connect the volume between the interior 12 of bellows 28 to a valve 90 just outboard the compressor. Valve 90 can vent the air within bellows 28 either overboard (as shown by arrow B) or to compressor discharge pressure (as shown by arrow A). At low power, that is, at or below a predetermined power level where the engine cooling requirements may be met by a reduced cooling flow, valve 90 may be actuated to vent overboard, which drops the pressure within bellows 28 to ambient pressure. The resulting pressure load on bellows 28 may axially displace a cylindrical arm 24 over some of the orifices 20 in flow restricting element 18, thereby restricting part of the cooling flow. Flow line 22 may be sized for rapid response of bellows 28 in order to quickly close some of the orifices 20. The low power level may be determined experimentally, by measuring engine component temperature to determine at which power level a reduced cooling flow may be effective. At or below this power level may be considered low power.

Bellows 28 may be designed in any suitable manner so long as it has the ability to move cylindrical arm 24 in response to changes in the interior 12 air pressure. For example, bellows 28 may be designed as a piston with the piston's cylinder acting as bellows housing 30 and the arm of the piston acting as cylindrical arm 24. A return spring would be used to react against the piston, ensuring that at low differential pressure across the piston, the arm is positioned to provide unrestricted cooling flow. Valve 90 may be tied to any parameter indicative of the temperature of the components designed to be cooled by the cooling flow system. For example, the temperature of the engine gas flow may be measured as being indicative of component temperature. The temperatures of the actual components themselves may also be measured. Further, the power level angle may also be measured so that once the operator puts the engine at a specific power level angle or higher, valve 90 will connect flow line 22 with compressor discharge pressure.

Cylindrical arm 24 of bellows 28 may be attached to a bellows free end 26. The other end of the bellows may be attached to bellows housing 30. Bellows housing 30, bellows springs, and bellows free end 26 define the interior 12 of bellows 28, into which flow line 22 communicates. When valve 90 connects flow line 22 with compressor discharge air, bellows free end 26 is in its free state, i.e. extended to an open position as shown in FIG. 2. When valve 90 connects flow line 22 with ambient air, the pressure loading can pull bellows free end 26 toward bellows housing 30, to place the variable flow system in a closed position, as shown in FIG. 3.

In order to accommodate the expected tolerance range in the spring rate of bellows 28, and to also accommodate the variation in compressor discharge pressure to overboard (ambient) pressure at various flight altitudes, cylindrical arm 24 may block off at least one set of orifices 20 in flow restricting element 18. A stop 34 on flow restricting element 18 may keep cylindrical arm 24 from moving too far shut. By appropriately choosing the spring rate of bellows 28, the line size 22, and the axial position of the orifices 20, tolerance and altitude pressure variation in displacement will have no bearing on flow through orifice 20. A surface 36 over which cylindrical arm 24 passes may have a low friction coating applied to prevent binding and allow for rapid bellows response to switching of valve from compressor discharge air to ambient air.

Bellows 28 as used in the example depicted in the drawing may be of any suitable configuration and may be made of any suitable material, such as a high temperature nickel alloy or Inconel 100. Bellows 28 and surrounding components may be made of a material capable of withstanding the operating temperatures of a gas turbine engine. These temperatures may typically range from about 600–1100° F.

The system may be designed so that failure modes are benign. More specifically, a failure of bellows 28 may drive cylindrical arm 24 to an open position by letting supply air pressure into the bellows cavity 12. Valve 90 may be designed to fail so that flow line 22 communicates with compressor discharge air, thereby keeping the variable flow system open. A failure of line 22 will let compressor air into the bellows plenum 12, thereby positioning the orifices 20 open.

While the above description describes the variable flow system having two sets of orifices 20, i.e. axial slots or holes, one of which may be closed by cylindrical arm 24, the system may also be designed with more than two sets of orifices, or may even have one elongated orifice over which cylindrical arm 24 covers a portion thereof at lower power. Alternatively, cylindrical arm 24 may be used to turn a valve within the orifices in order to limit the amount of cooling air flowing therethrough. In the alternate embodiment having three sets of orifices in flow restricting element 18, for example, valve 90 may communicate flow line 22 with not only ambient air and compressor discharge air, but also with an air source having a pressure somewhere between the air pressure of ambient air and compressor discharge air such as an intercompressor source. Flow restricting element 18 may then have three sets of orifices therethrough. When the valve connects flow line 22 with compressor discharge air, the bellows is in an open position. When the valve moves to connect flow line 22 with the middle pressure air source (not shown), cylindrical arm 24 may partially close, closing off one of the three sets of orifices. Finally, when the valve moves to connect flow line 22 with ambient air, cylindrical arm 24 may close all the way to stop 34, closing off two of the three sets of orifices in flow restricting element 18, leaving at least one set of orifices always open.

The variable flow cooling system of the present invention may result in about a 20 to about 80% reduction in cooling air requirements. Preferably, the variable flow cooling system of the present invention results in up to about a 40 to about a 70% reduction, and more preferably, up to about a 50% reduction or more in cooling air requirements. This reduction in the need for compressor discharge air increases the fuel efficiency of the gas turbine engine by not wasting energy in the form of air compression work on unnecessarily large amounts of compressor discharge cooling air.

It should be understood, of course, that the foregoing relates to preferred embodiments of the invention and that modifications may be made without departing from the spirit and scope of the invention as set forth in the following claims.

We claim:

1. A variable flow cooling system comprising:
   a source of cooling air providing a cooling air flow along a flow path;
   a flow restriction element in said flow path having at least one orifice or one set of orifices therein;
   a source of pressurized fluid;
   a bellows having a single flow line connecting an interior of said bellows in the alternative with one of said source of pressurized fluid and with ambient air;
   an arm moveably attached to said bellows wherein movement of said bellows moves said arm to regulate said cooling air flow.

2. The variable flow cooling system according to claim 1, wherein movement of said bellows moves said arm to either an open position, covering none of said orifices, or a closed position, covering at least a portion of said at least one orifice, thereby restricting flow of said coolant fluid through said flow path.

3. The variable flow cooling system according to claim 1, wherein said pressurized fluid is compressor discharge air.

4. The variable flow cooling system according to claim 1, wherein said at least one orifice or one set of orifice are two orifices or two sets of orifices.

5. The variable flow cooling system according to claim 4, wherein movement of said bellows moves said arm to either an open position, covering none of said orifices, or a closed position, covering one of said two orifices or sets of orifices, thereby restricting flow of said cooling fluid through said flow path.

6. The variable flow cooling system according to claim 4, further comprising a stop, said arm contacting said stop when said arm is in a closed position, covering one of said two orifices or sets of orifices, said stop preventing said arm from covering the second of said two orifices or sets of orifices.

7. The variable flow cooling system according to claim 1, wherein said bellows comprises:
   a bellows housing, a bellows free end and said arm, said arm connecting said bellows free end to said bellows housing; and
   said arm connected to said bellows free end, thereby moving said arm with said bellows free end.

8. The variable flow cooling system according to claim 7, wherein:

pressure difference between interior and exterior of bellows provides a force to pull said bellows free end toward said bellows housing when said interior is at ambient pressure;

said force moving said arm over at least one of said slots.

9. The variable flow cooling system according to claim 7, wherein said spring is resiliently restored when said flow line communicates with said pressurized fluid, thereby moving said arm to uncover said slots.

10. The variable flow cooling system according to claim 1, wherein said flow line communicates with said pressurized fluid during a fail mode of said cooling system.

11. The variable flow cooling system according to claim 1, further comprising a low friction coating between said arm and a portion of a bellows housing on which said arm moves when said bellows is extended or compressed.

12. The variable flow cooling system according to claim 1, further comprising a valve communicating an interior of said bellows with either said pressurized fluid or to ambient air.

13. The variable flow cooling system according to claim 1, wherein:
said at least two orifices or sets of orifices are at least three orifices or three sets of orifices;
said source of pressurized air provides at least a high pressurized fluid source and a low pressurized fluid source;
said flow line connecting an interior of said bellows with either said high pressurized fluid source, said low pressurized fluid source or with ambient air via a 3-way valve; and
said high pressurized fluid source being sufficient to move said arm to said open position, said low pressurized fluid source being sufficient to move said arm to a first closed position, closing at least one of said orifice or set of orifices, and said ambient air being sufficient to move said arm to a second closed position, closing at least one more orifice or set of orifices than said low pressurized fluid source.

14. A variable flow cooling system for providing a cooling air flow to components of a gas turbine engine comprising:
a source of cooling air providing said cooling air flow along a flow path;
a flow restriction element in said flow path having at least two orifices or two sets of orifices therein;
a source of pressurized air;
a bellows having a single flow line connecting an interior of said bellows in the alternative with one of said source of pressurized fluid and with ambient air;
an arm moveably attached to said bellows;
a bellows housing, a bellows free end and said arm, each of which, along with at least one bellows spring, define said interior of said bellows;
said arm connected to said bellows free end, thereby moving said arm with said bellows free end, wherein movement of said bellows free end moves said arm to either an open position, covering none of said orifices, or a closed position, covering at least one of said orifices, thereby restricting flow of said cooling fluid through said flow path.

15. The variable flow cooling system according to claim 14, further comprising a stop, said arm contacting said stop when said arm is in a closed position, covering one of said orifices, said stop preventing said arm from covering all of said orifices.

16. The variable flow cooling system according to claim 14, wherein:

pressure difference between interior and exterior of bellows provides a force to pull said bellows free end toward said bellows housing when said interior is at ambient pressure;
said force moving said arm over at least one of said orifices;
said spring is resiliently restored when said flow line communicates with said pressurized fluid, thereby moving said arm to uncover said orifices.

17. The variable flow cooling system according to claim 14, wherein said flow line communicates with said pressurized fluid during a fail mode of said cooling system.

18. A variable flow cooling system for providing a cooling air to components of a gas turbine engine comprising:
a source of cooling air providing said cooling air along a flow path;
a flow restriction element in said flow path having two orifices or two sets of orifices therein;
a source of pressurized air provided by a turbine engine compressor discharge;
a bellows having a single flow line connecting an interior of said bellows in the alternative with one of said source of pressurized fluid and with ambient air;
an arm moveably attached to said bellows;
a bellows housing, a bellows free end and said arm, and at least one bellows spring, each of which define said interior of said bellows;
said arm connected to said bellows free end, thereby moving said arm with said bellows free end, wherein movement of said bellows free end moves said arm to either an open position, covering none of said orifices, or a closed position, covering one of said orifices or sets of orifices, thereby restricting flow of said cooling fluid through said flow path;
a stop, said arm contacting said stop when said arm is in a closed position, covering one of said orifice or set of orifices, said stop preventing said arm from covering both of said orifices or sets of orifices; and
a low friction coating between said arm and a portion of a bellows housing on which said arm moves when said bellows is extended or compressed, wherein pressure difference between interior and exterior of bellows provides a force to move said bellows free end toward said bellows housing when said interior is at ambient pressure;
said force moving said arm over one of said orifices; and
said spring is restored deformed when said flow line communicates with said pressurized fluid, thereby moving said arm to uncover said orifices.

19. A gas turbine engine having variable flow cooling system comprising:
a source of cooling fluid providing a cooling fluid flow along a flow path;
a flow restriction element in said flow path having at least two orifices or two sets of orifices therein;
a source of pressurized fluid;
a bellows having a single flow line connecting an interior of said bellows in the alternative with one of said source of pressurized fluid and with ambient air; and
an arm moveably attached to said bellows wherein movement of said bellows moves said arm to either an open position, covering none of said orifices, or a closed position, covering at least one of said orifices or one set of orifices, thereby restricting flow of said cooling fluid through said flow path.

20. The gas turbine engine according to claim 19, wherein:

said pressurized fluid is compressor discharge air; and said at least one orifice or one set of orifice are two orifices or two sets of orifices.

21. The gas turbine engine according to claim 20, further comprising a stop, said arm contacting said stop when said arm is in a closed position, covering one of said two orifices or two sets of orifices, said stop preventing said arm from covering the second of said two orifices or set of orifices.

22. The gas turbine engine according to claim 21, wherein said bellows comprises:
   a bellows housing, two bellows seals or springs, a bellows free end and said arm, each of which define said interior of said bellows;
   said arm connected to said bellows free end, thereby moving said arm with said bellows free end.

23. The gas turbine engine according to claim 22, wherein:
   pressure difference between interior and exterior of bellows provides a force on said bellows free end, thereby pulling said bellows free end toward said bellows housing when said interior is at ambient pressure;
   said force moving said arm over at least one of said orifice or set of orifices; and
   said spring is resiliently restored when said flow line communicates with said pressurized fluid, thereby moving said arm to uncover said orifices.

24. The gas turbine engine according to claim 23, wherein said flow line communicates with said pressurized fluid during a fail mode of said cooling system, thereby placing said cooling system in an open position.

25. A method for modulating cooling flow to a turbine, comprising:

providing said cooling flow along a flow path;

disposing a flow restriction element in said flow path having at least two orifices or two sets of orifices therein;

connecting an interior of a bellows in the alternative with one of a source of pressurized fluid and with ambient air;

defining said interior of said bellows by a bellows housing, at least two bellows spring or seals, a bellows free end and an arm;

movably connecting said arm to said bellows free end, thereby allowing movement of said arm with movement of said bellows free end, wherein movement of said bellows free end moves said arm to either an open position, covering none of said orifices, or a closed position, covering at least one of said orifices or sets of orifices, thereby restricting flow of said cooling fluid through said flow path.

26. The method according to claim 25, further comprising:
   preventing said arm from covering all of said orifices by providing a stop, wherein said arm contacts said stop when said arm is in a closed position, covering at least one of said orifice or set of orifices.

27. The method according to claim 25, further comprising communicating said flow line with said pressurized air during a fail mode of said cooling system.

* * * * *